United States Patent [19]

Goldstein et al.

[11] 4,180,728

[45] Dec. 25, 1979

[54] NEUTRON ACTIVATION PROBE FOR MEASURING THE PRESENCE OF URANIUM IN ORE BODIES

[75] Inventors: Norman P. Goldstein, Murrysville; Richard C. Smith, O'Hara Township, Allegheny County, both of Pa.

[73] Assignee: Westinghouse Electric Corp., Pittsburgh, Pa.

[21] Appl. No.: 895,323

[22] Filed: Apr. 11, 1978

[51] Int. Cl.$^2$ ............................................. G01V 5/00
[52] U.S. Cl. .................................. 250/264; 250/265; 250/269
[58] Field of Search ............... 250/253, 262, 264, 265, 250/266, 269, 270, 390, 391

[56] References Cited

U.S. PATENT DOCUMENTS

| | | | |
|---|---|---|---|
| 3,686,503 | 8/1972 | Givens et al. | 250/269 |
| 3,825,753 | 7/1974 | Givens | 250/269 X |

*Primary Examiner*—Davis L. Willis
*Attorney, Agent, or Firm*—L. A. DePaul; Z. L. Dermer

[57] ABSTRACT

A neutron activation probe comprises a pulsed neutron source in series with a plurality of delayed neutron detectors for measuring radioactivity in a well borehole together with a NaI (Tl) counter for measuring the high energy 2.62 MeV gamma line from thorium. The neutron source emits neutrons which produce fission in uranium and thorium in the ore body and the delayed neutron detectors measure the delayed neutrons produced from such fission while the NaI (Tl) counter measures the 2.62 MeV gamma line from the undisturbed thorium in the ore body. The signal from the NaI (Tl) counter is processed and subtracted from the signal from the delayed neutron detectors with the result being indicative of the amount of uranium present in the ore body.

10 Claims, 1 Drawing Figure

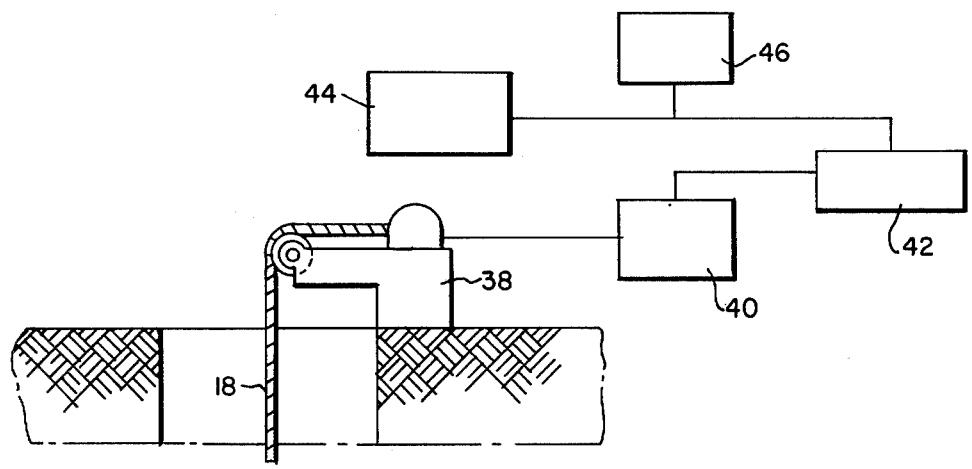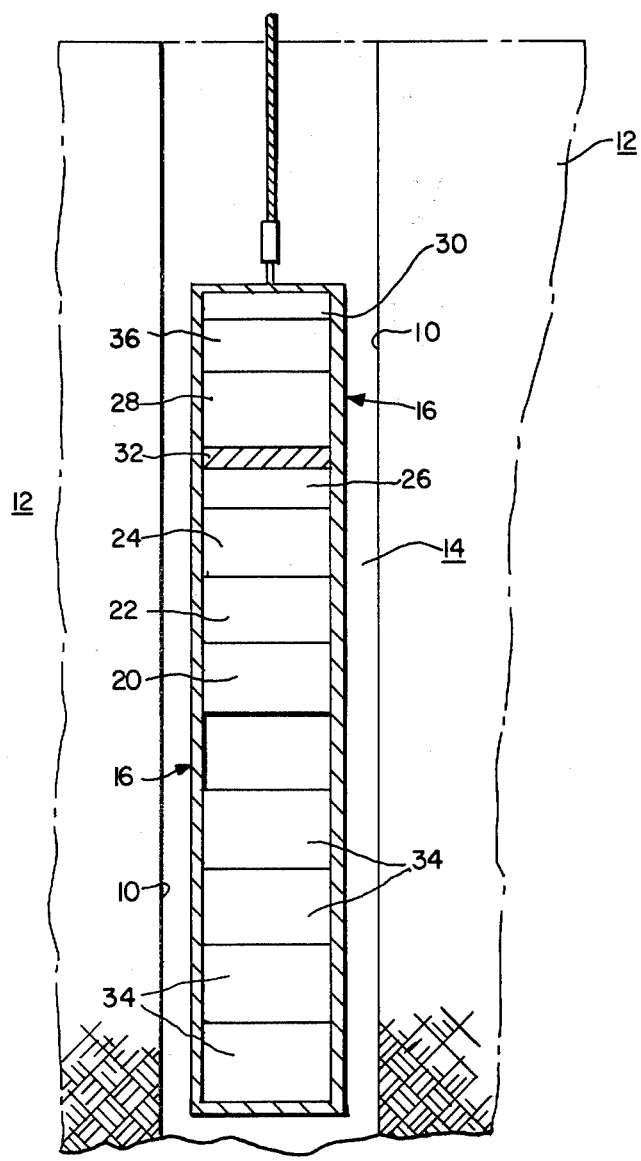

NEUTRON ACTIVATION PROBE FOR MEASURING THE PRESENCE OF URANIUM IN ORE BODIES

CROSS-REFERENCE TO RELATED APPLICATIONS

The invention described herein is related to copending application Ser. No. 873,343, filed Jan. 30, 1978 in the name of R. C. Smith and assigned to the assignee of the present invention.

BACKGROUND OF THE INVENTION

This invention relates to radiation detectors and particularly to neutron and gamma radiation detectors for measuring the presence of uranium in ore bodies.

In the exploration and mining of uranium from naturally occurring ore bodies, it is necessary to determine the location and quantity of the ore in order to determine if mining the particular ore body is economically feasible. There are many methods known in the art for exploring ore bodies, one of which is well logging in which boreholes are drilled in the ore body and electronic instruments are moved through the borehole. The electronic instruments detect radiation from the ore body which gives an indication of the amount of radioactive material present in the ore body. However, unlike uranium, not all radioactive material is of a fissionable nature and, therefore, not desirable to mine. For example, radium which is a daughter product of uranium is radioactive but is not fissionable. Furthermore, while radium and uranium are often found together, geological or natural chemical processes may separate them so that a radiation indication may result from the presence of radium and not be an indication of the presence of uranium. Therefore, it is important to be able to determine the location of fissionable isotopes such as uranium by utilizing mechanisms that can distinguish between the radiation produced by fissionable isotopes and the radiation produced by nonfissionable isotopes.

In U.S. Pat. No. 3,686,503, entitled "In-Situ Assaying For Uranium In Rock Formations," issued Aug. 22, 1972 by W. W. Givens et al., there is described a method for quantitatively measuring uranium ore grade. The method employs a tool containing a source of neutrons and a neutron detector that is placed in a borehole at the level of a formation of interest. The source is operated cyclically to irradiate a zone in the formation with neutrons. Neutrons resulting from the irradiation of the zone in the formation are detected and recorded to obtain a record of delayed neutrons emitted as a result of neutron fission of uranium. Recording takes place within each cycle beginning at a time period after the source neutrons have died away via absorption in the formation. Recording the number of neutrons emitted as a result of the fission process gives an indication of the quantity of uranium present in the formation.

Although there exist methods of measuring the amount of fissionable isotopes present in an ore body, more than one type of fissionable isotope may be present in the ore body making it necessary to be able to distinguish between the uranium present and the other fissionable isotopes. In many instances, thorium, a fissionable isotope, is present along with uranium in an ore body. Since a mere indication of the amount of fissionable isotopes present in such an ore body would not indicate the relative amount of uranium present, it is desirable to be able to determine the amount of uranium in the ore body without the reading being influenced by the presence of thorium. Therefore, a neutron activation probe is needed that is capable of accurately measuring the amount of uranium present in an ore body without the reading being influenced by the presence of thorium in the ore body.

SUMMARY OF THE INVENTION

A neutron activation probe comprises a neutron source in colinear alignment with a fast neutron monitor, a plurality of delayed neutron detectors, and a NaI (Tl) counter for measuring radioactivity in a well borehole as the probe is moved through the borehole. The neutron source emits pulses of fast neutrons which produce fission in uranium-238 and thorium-232 in the ore body while the fast neutron monitor detects the fast neutrons generated by the neutron source in order to monitor the performance of the neutron source. Some of the fast neutrons become thermal neutrons and produce fission in uranium-235 in the ore body. Signals from the plurality of delayed neutron detectors are registered during the time between pulses of the neutron source so as to detect the delayed neutrons resulting from fission of the fissionable isotopes produced by the fast and thermal neutrons that originally come from the neutron source without detecting the fast neutrons. The NaI (Tl) counter measures the high energy 2.62 MeV gamma line from the undisturbed fraction of the thorium present in the ore body between pulses of the neutron source in order to determine the amount of thorium present. The signal from the NaI (Tl) counter is then processed and subtracted from the signal from the delayed neutron detectors with the result being indicative of the amount of uranium present in the ore body.

BRIEF DESCRIPTION OF THE DRAWING

While the specification concludes with claims particularly pointing out and distinctly claiming the subject matter of the invention, it is believed the invention will be better understood from the following description taken in conjunction with the accompanying single FIGURE of drawing wherein the FIGURE is a cross-sectional view in elevation of the neutron activation probe and diagram of the recording system.

DESCRIPTION OF THE PREFERRED EMBODIMENT

In exploration for uranium and in in-situ solution mining of uranium, it is important to be able to determine the location and grade of the uranium within the ore body so as to avoid costly excessive drilling. Often uranium and thorium, both fissionable isotopes, are located in an ore body so that a determination of the amount of fissionable isotopes present in the ore body would not be indicative of the amount of uranium therein. The invention described herein provides a probe for detecting the amount of uranium present in an ore body even when thorium is also present.

Referring to the Figure, a borehole 10 is drilled by conventional methods into the ore body 12. The neutron activation probe 14 which may have a stainless steel casing 16 is suspended within borehole 10 by cable 18. A fast neutron source 20 which may be a sealed-tube accelerator that produces 14.3 MeV neutrons by a deuterium-tritium reaction is disposed in casing 16 for producing fast neutrons some of which cause a portion of the $^{238}$U and $^{232}$Th located in ore body 12 to fission and others of which are eventually slowed and cause a portion of the $^{235}$U located in ore body 12 to fission. A high voltage pulse transformer 22, a pulser 24 such as a spark-gap switched capacitor discharge circuit, and a power supply 26 which may be a 5 KV D.C. source connected to an above-ground A.C. supply through cable 18 are located in casing 16 for causing neutron source 20 to generate fast neutrons in regular pulses as commanded by the above-ground instrumentation. Apparatus for producing such regular neutron pulses is also described in U. S. Pat. No. 3,686,503 by W. W. Givens et al. and entitled "In-Situ Assaying for Uranium In Rock Formations." Neutron source 20 may be set to pulse at intervals such as 0.50 seconds, while the duration of the pulse of the neutron source 20 may be approximately 6 microseconds.

A fast neutron monitor 28 such as a scintillation detector that is relatively insensitive to gamma radiation and that may be chosen from those well known in the art such as the NE-451 manufactured by Nuclear Enterprises, Inc. in combination with a phototube may be disposed in casing 16 above neutron source 20. Amplifier mechanism 30 which includes a DC power source and a plurality of amplifiers is also disposed in casing 16 and electrically connected to fast neutron monitor 28 for controlling fast neutron monitor 28 and for transmitting electrical signals to above-ground instrumentation. Fast neutron monitor 28 serves to detect the amount of fast neutrons near probe 14 so as to be able to monitor the output of neutron source 20. Any change in the amount of fast neutrons produced by neutron source 20 can be detected by fast neutron monitor 28. In addition, an X-ray shield 32 which may be a lead disc is disposed between neutron source 20 and fast neutron monitor 28 so as to shield fast neutron monitor 28 from X-rays produced by neutron source 20 thereby increasing the reliability of the fast neutron monitor 28.

A plurality of delayed neutron detectors 34 which may be helium-3 filled gas proportional counters such as type 253 manufactured by LND, Inc. of Oceanside, N.Y. are arranged colinearly in casing 16 and below fast neutron generator 20. Each delayed neutron detector 34 is connected to a separate amplifier in amplifier mechanism 30 that amplifies the signals from the delayed neutron detector 34. Delayed neutron detectors 34 serve to detect the amount of delayed neutrons produced by the fission of fissionable isotopes in ore body 12 that has been caused by neutron source 20. Since the amount of delayed neutrons detected by the delayed neutron detector 34 is a linear function of the amount of fissionable isotopes present in the ore body such as uranium and thorium, it is possible to approximate the amount of fissionable isotopes in the ore body by determining the amount of delayed neutrons detected by delayed neutron detectors 34. Delayed neutrons detectors 34 are electrically connected to above-ground instrumentation that not only controls the pulses of the neutron source 20 but also controls the gating of the signals from the delayed neutron detectors 34 so that the signals from delayed neutron detectors 34 are ignored during the pulses of neutron source 20 and accepted for processing between pulses of neutron source 20. In this manner, signals accepted from the delayed neutron detectors 34 will not be affected by the fast neutrons generated by neutron source 20. This is possible because neutron source 20 will only be pulsed at intervals of 0.50 secs while the duration of the neutron source pulse is on the order of 6 microsec and the lifetime of both the neutrons from neutron source 20 and any induced prompt fission neutrons is on the order of 1 msec. Therefore, the signals from the delayed neutron detectors 34 need only be ignored for approximately 10 msec of the 0.50 sec interval between pulses of neutron source 20. Thus, the signals from the delayed neutron detectors 34 have sufficient time to represent the delayed neutron intensity without interference from the neutrons from neutron source 20.

A NaI (Tl) scintillation counter 36 which may be an integral line assembly Type-S manufactured by the Harshaw Chemical Co. is disposed in casing 16 below amplifier mechanism 30. Counter 36 is chosen such that it is sensitive to the 2.62 MeV line corresponding to the gamma radiation produced by the undisturbed $^{236}$Th in the ore body. A major source of background radiation resulting from the gamma radiation produced by neutron source 20 during the neutron pulse is eliminated by gating off counter 36 during pulses of neutron source 20. To accomplish the gating, counter 36 is electrically connected to the above-ground instrumentation. Counter 36 is also electrically connected to a high voltage D.C. power supply located in casing 16 and chosen from those well known in the art and connected to above-ground instrumentation including a single channel analyzer such as a Type 550 manufactured by Ortec, Inc. for separating the counts due to the 2.62 MeV gamma line from others registered in counter 36, and a counting rate meter chosen from those well known in the art such as a Type 441 produced by Ortec, Inc. for indicating the counting rate of the 2.62 MeV gamma line from the single channel anaylzer. In addition, counter 36 is connected to amplifier mechanism 30 for amplifying the signal transmitted to the single channel analyzer. Counter 36 is capable of detecting the 2.62 MeV peak in the gamma spectrum emitted by the undisturbed fraction of the $^{232}$Th in the ore body. The 2.62 MeV line has the advantage of being free from interference due to gamma lines from natural activity in radium and its daughter products. Furthermore, it appears that the 2.62 MeV line is the only line in the thorium spectrum that is free from significant interference.

Cable 18 which supports probe 14 is attached to drive mechanism 38 which may be a motor and spool arrangement for winding and unwinding cable 18 so that probe 14 can be raised or lowered through borehole 10. Drive mechanism 38 may also comprise a mechanism for recording the length of cable 18 that has been wound or unwound such as a rotary encoder chosen from those well known in the art. By thus recording the length of the cable 18, the depth of probe 14 within borehole 10 may be determined and the readings of the detectors of probe 14 may be compared with such a depth reading to thereby correlate the two readings. In this manner, the determination made as to the mineralization can be associated with the appropriate location of the mineralization in the ore body.

The instrumentation within probe 14 such as delayed neutron detectors 34 and counter 36 are electrically connected to above-ground instrumentation through cable 18. The above-ground instrumentation may include an electronics control and signal processing unit 40 which is connected to power supply 26 for causing neutron source 20 to produce regular pulses, to fast neutron monitor 28 for processing the signals therefrom, and to delayed neutron detectors 34 and counter 36 for gating the signals therefrom on or off and for processing the signals therefrom. A minicomputer 42 such as a TI-930B manufactured by the Texas Instrument Corp. may also be employed to process the signals from the several delayed neutron detectors 34 and counter 36.

An important feature of probe 14 is that delayed neutron detectors 34 are a plurality of short thermal neutron detectors. Each of such delayed neutron detectors could be approximately 8 inches in length with several of them aligned colinearly within casing 16. In addition, the output signal of each delayed neutron detector 34 is retarded in time by an amount (l/v) with respect to the delayed neutron detector immediately following it (where l is the distance a detector would have to move for its position to coincide exactly with that of the preceding detector and v is the speed of probe 14 through borehole 10). Accordingly, if there are three delayed neutron detectors 34, the signals from the first one entering a zone to be assayed would be retarded in time by an amount (2 l/v), the signals from the second would be delayed by an amount (l/v), and the signals from the last one would not be delayed at all. This can be accomplished by the above-ground instrumentation such as minicomputer 42. Also, minicomputer 42 can then add these delayed signals with the so added signals being registered for processing with the signals from counter 36. By so adding the delayed signals, a higher count of delayed neutrons from a particular zone is obtainable thus increasing the statistical accuracy of the reading. Furthermore, the shortness of each delayed neutron detector enables probe 14 to obtain readings for smaller zones of the ore body which thereby improves the spatial resolution of the device. However, short individual delayed neutron detectors would ordinarily not detect a sufficient amount of delayed neutrons to be statistically accurate. This problem is, of course, eliminated by the use of several short delayed neutron detectors whose signals are delayed in time and then added to obtain a statistically significant reading over a smaller ore zone.

The contribution of the $^{232}$Th to the total delayed neutron counting rate is determined by multiplying the counting rate of the 2.62 MeV gamma line determined by counter 36 by a predetermined constant. This constant depends on the relative counting efficiencies of delayed neutron detectors 34 and counter 36, the ratio of the fission probability per gram of $^{232}$Th as compared to that of uranium, and the number of 2.62 MeV gammas emitted per gram of $^{232}$Th. This constant will be a fixed value for a given probe design and can be determined experimentally by common methods prior to use of the neutron probe. The signal from counter 36 must be multiplied by the predetermined constant so that the signal resulting from the 2.62 MeV gammas will be representative of the amount of $^{232}$Th in the ore body at the position of the counter. In addition, the counts from counter 36 have to be delayed by a time (l'/v) with respect to the lowest of the delayed neutron detectors 34, where l' is the distance between counter 36 and the lowest delayed neutron detector 34, to account for their different positions in the probe. The product of the appropriately retarded signal from counter 36 and the predetermined constant is then subtracted from the processed added signal from delayed neutron detectors 34 so that the output signal will be corrected for the presence of thorium at each position. This processing of signals may be accomplished by minicomputer 42. Such a corrected output signal would then be indicative of the amount of uranium present in the ore body. The processed signals from delayed neutron detectors 34 and counter 36 may be displayed on a paper chart recorder 44 and the output may be recorded on magnetic tape recorder 46.

OPERATION

In operation, probe 14 is lowered through borehole 10 by cable 18 to the maximum desired depth. At this point the above-ground instrumentation is activated along with the probe devices. Neutron source 20 then begins to emit fast neutrons which penetrate ore body 12 and cause the fissionable isotopes therein such as uranium and thorium to fission. The daughter products of uranium and thorium then emit delayed neutrons which are detected by delayed neutron detectors 34. At the same time, fast neutron monitor 28 monitors the output of neutron source 20 and counter 36 registers the 2.62 MeV gamma lines from the $^{232}$Th. Delayed neutron detectors 34 and counter 36 are continuously activated, but their signals are gated off by electronics control and signal processing unit 40 so as to be registered only between pulses of neutron source 20 so that the neutrons and gamma counts from the neutron source itself are eliminated. The signals of these devices are transmitted electrically through cable 18 to the above-ground instrumentation where the signals are processed and recorded. As this is occurring probe 14 is moved upwardly through borehole 10 by cable 18 and drive mechanism 38. These readings are taken as probe 14 is moved upwardly rather than moved downwardly because probe 14's movement may be more accurately controlled by pulling it through borehole 10. However, these readings may also be obtained by reversing the probe and lowering it through the borehole. Each delayed neutron detector being relatively short detects delayed neutrons only from a relatively short ore zone. However, since probe 14 is being moved and since the signals from each delayed neutron detector are appropriately delayed in time, the total reading of probe 14 corresponding to a particular relatively short ore zone is more accurate. The above-ground instrumentation corrects for the presence of thorium by multiplying the signal from counter 36 by the predetermined constant and then subtracting the corrected signal from the processed signal from the delayed neutron detectors 34. The resultant signal is then displayed which indicates the amount of uranium at various locations within the ore body. As probe 14 continues up borehole 10, the entire ore body can be thus investigated. In addition, should fast neutron monitor 28 detect variations in the output of neutron source 20, the results obtained by delayed neutron detectors 34 and counter 36 can be accordingly adjusted. As an alternate, a californium-252 source may be used as a neutron source and operated in a source-jerk mode. Therefore, the invention provides a probe for detecting uranium mineralization in an ore body without being distorted by the presence of thorium.

We claim as our invention:
1. A neutron activation probe for assaying the amount of uranium isotopes in an ore body comprising:
   a casing;
   drive means located above ground and attached to said casing for moving said casing through a borehole in said ore body;
   neutron source means disposed in said casing for emitting neutrons for fissioning fissionable isotopes within said ore body and consequently emitting delayed neutrons;

a plurality of delayed neutron detectors arranged colinearly in said casing below said neutron source means for detecting said delayed neutrons;

a NaI (T1) counter disposed in said casing for detecting the 2.62 MeV line emitted by the naturally occurring thorium in said ore body;

neutron monitoring means disposed in said casing for monitoring said neutron source means; and control means for controlling the pulsing of said neutron source means, for registering the signals from said delayed neutron detectors and said counter between pulses of said neutron source means, for delaying the signal of each of said delayed neutron detectors by an amount sufficient to correspond each of said signals with the same ore zone of said ore body and for adding each of said signals so delayed, and for processing the signal from said counter and subtracting the processed signal from said counter from the sum of the signals from said delayed neutron detectors for each section of ore zone and displaying the result with the result being indicative of the amount of uranium present in the ore body without being influenced by the amount of thorium present therein.

2. The neutron activation probe according to claim 1 wherein said control means comprises:

a control and processing unit located above ground and electrically connected to said neutron source means for controlling the pulsing of said neutron source means, and connected to said neutron monitoring means for processing the signals therefrom, and connected to said delayed neutron detectors and said counter for processing the signals therefrom.

3. The neutron activation probe according to claim 2 wherein said control means further comprises computing apparatus connected to said control and processing unit for increasing the signal from said counter relative to the signal from said delayed neutron detectors and for subtracting said increased signal from the signal from said delayed neutron detectors.

4. The neutron activation probe according to claim 3 wherein said neutron monitoring means comprises:

a scintillation detector together with a phototube and an X-ray shield for detecting the amount of neutrons emitted by said neutron source means.

5. The neutron activation probe according to claim 4 wherein said neutron monitoring means further comprises an amplifier mechanism disposed in said casing and connected to said scintillation detectors and said phototube for transmitting signals to said control and processing unit.

6. The neutron activation probe according to claim 5 wherein said neutron source means comprises:

a sealed-tube accelerator disposed in said casing and capable of producing 14.3 MeV neutrons by a deuterium-tritium reaction.

7. The neutron activation probe according to claim 6 wherein said neutron source means further comprises:

a high voltage direct current power source disposed in said casing and connected to an above-ground alternating current power supply and connected to said control and processing unit;

a pulser disposed in said casing and connected to said high voltage direct current power source; and a high voltage pulse transformer disposed in said casing and connected to said pulser and to said sealed-tube accelerator for providing a high voltage pulse to said sealed-tube accelerator for emitting neutrons under command of said control and processing unit.

8. The neutron activation probe according to claim 7 wherein each of said delayed neutron detectors comprise a helium-3 filled gas proportional counter.

9. A method for determining the amount of fissionable isotopes present in an ore body comprising:

moving a neutron activation probe through a borehole in an ore body;

emitting pulses of fast neutrons from said probe that cause fissioning of said fissionable isotopes in said ore body;

detecting between pulses of fast neutrons the amount of delayed neutrons emitted from the daughter products of said fissionable isotopes by using a plurality of relatively short delayed neutron detectors;

detecting between pulses of fast neutrons the 2.62 MeV line of the gamma spectra emitted by the undisturbed thorium;

monitoring the amount of fast neutrons emitted and causing the detection of said delayed neutrons and said 2.62 MeV line only when said fast neutrons are not being emitted; and multiplying the amount of said 2.62 MeV line so detected by a predetermined constant and subtracting the result from the amount of delayed neutrons so detected and displaying the remainder with the remainder being indicative of the amount of uranium present in the ore body.

10. The method according to claim 9 wherein said predetermined constant is determined experimentally prior to beginning the method.

* * * * *